United States Patent Office 3,546,595
Patented Dec. 8, 1970

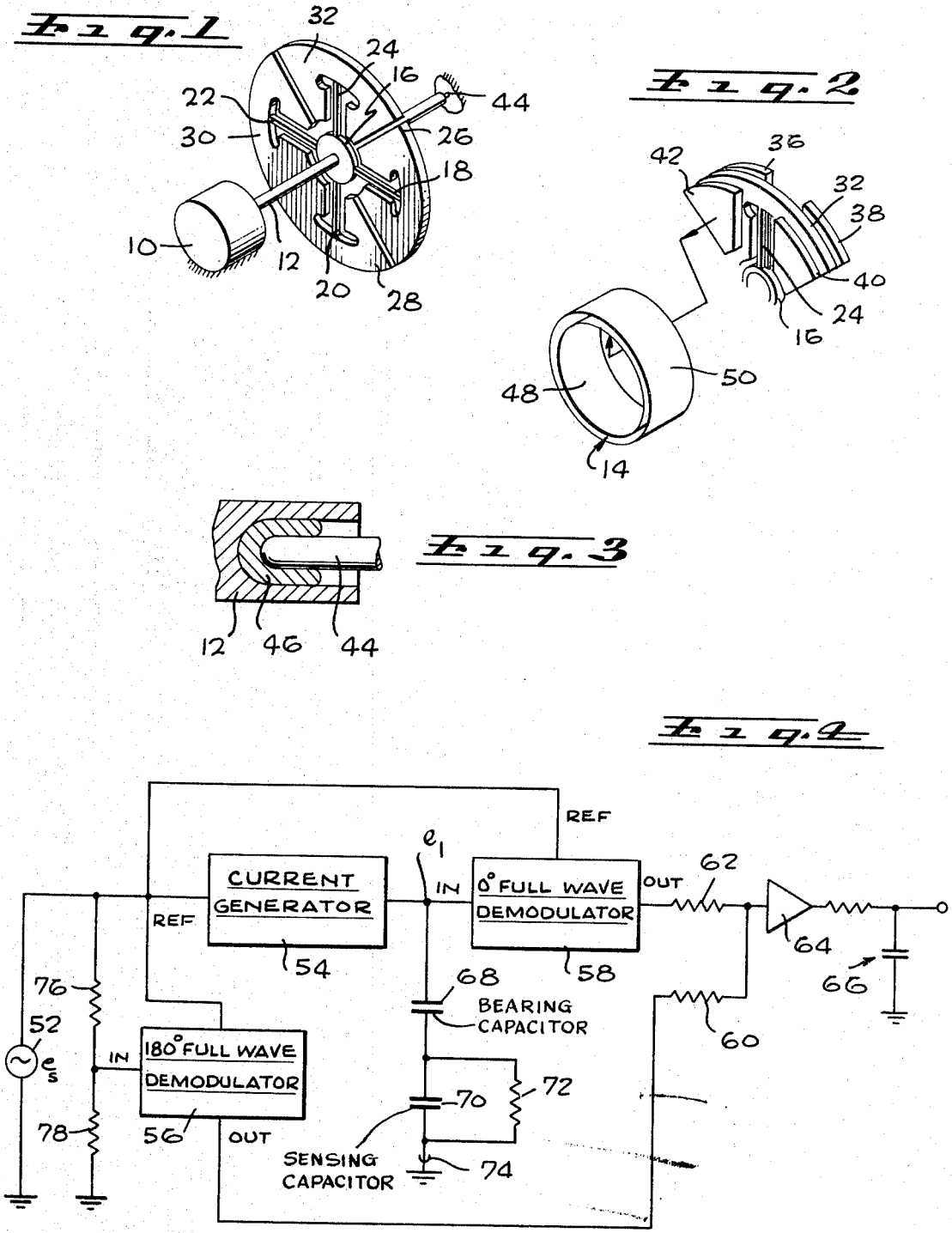

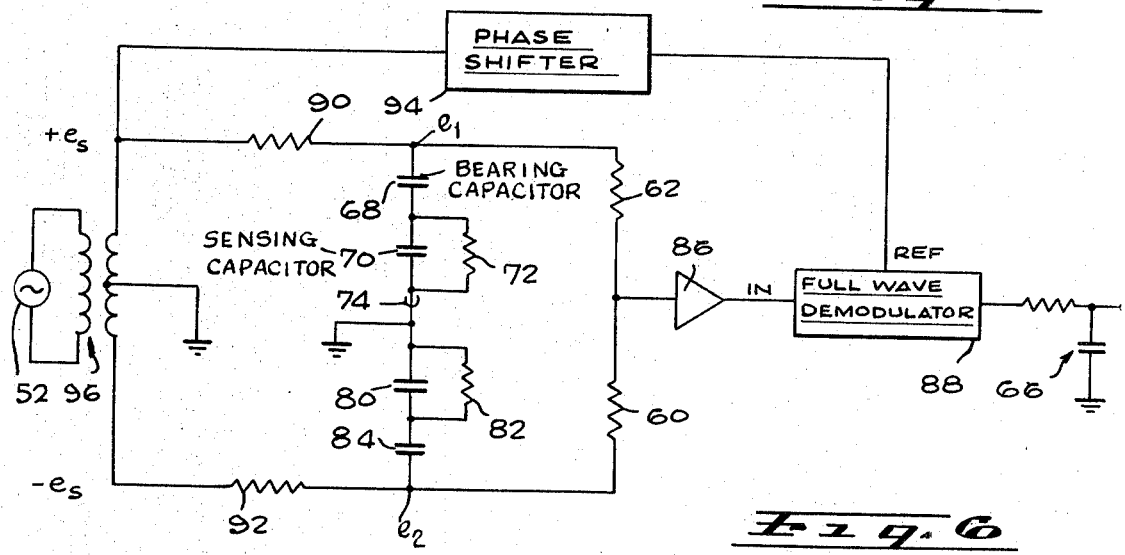
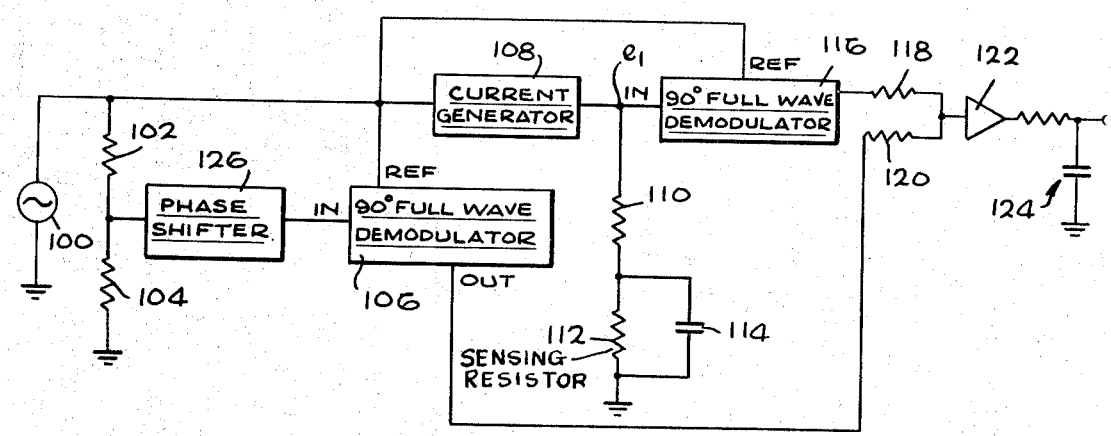
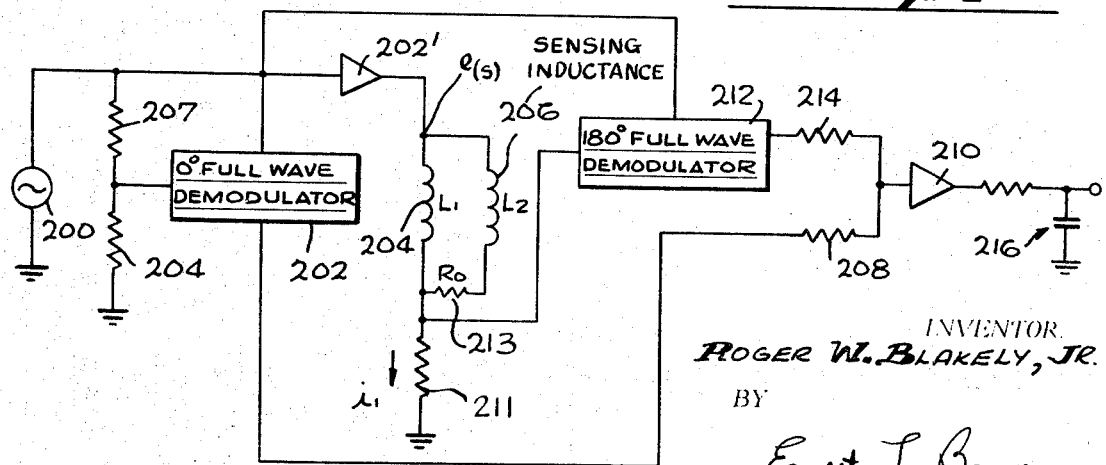

3,546,595
NOISE REJECTION CIRCUIT
Roger W. Blakely, Jr., Los Angeles, Calif., assignor to Litton Systems, Inc., Beverly Hills, Calif., a corporation of Maryland
Filed July 10, 1967, Ser. No. 652,259
Int. Cl. G01n 27/00
U.S. Cl. 328—1
10 Claims

ABSTRACT OF THE DISCLOSURE

A circuit for sensing changes in a small immittance which is connected in a circuit with a large immittance, and particularly where the immittance is capacitive, e.g. sensing of small changes in capacitance of a capacitor upon an air-bearing-suspended member wherein said capacitor has a smaller capacitance than the capacitance across the suspension air bearing and wherein the air bearing capacitance is used to carry signals across the air bearing.

SHORT DESCRIPTION OF THE INVENTION

The term "immittance" is defined to mean impedance or admittance.

It is sometimes necessary to sense changes in electrical capacitance of an electrical capacitor wherein said capacitor is connected in circuit with a second caapcitor whose capacitance is also changing. For example—in inertial guidance instruments, such as the instrument described and claimed in patent application Ser. No. 612,401, filed Jan. 30, 1967 entitled "Two-Axes Angular Rate and Linear Acceleration Multisensor" by Harold F. Erdley, a rotatable member may be supported upon air bearings relative to a storage member. Upon the supported member may be—for example—a variable capacitor. The variation in capacitance of the variable capacitor may—for example—be caused by applied acceleration, rotation, force, or the like.

In general, it is preferable not to use slip rings to carry electrical signals across an air bearing. Consequently, it is desirable to carry the signals through the air bearing capacitance itself. Output signals caused by variation of the capacitance of the sensing capacitor and output signals caused by variation of the capacitance across the gas support-bearing are ordinarily indistinguishable. The circuits of this invention, however, cause the desired and the unwanted signals to have different characteristics, i.e. to be in phase-quadrature, whereby they are separated.

In the circuits contemplated by this invention, the parameters are adjusted precisely, in a predetermined fashion to be described, to reduce the noise in the circuit, thereby to enhance the sensing of changes of capacitance of the sensing capacitor which is carried upon the supported element.

It is apparent that the principles of the invention are applicable not only to sensing signals caused by changes in capacitance of a sensing capacitor, but also to the sensing of signals caused by changes in inductance or resistance of sensing inductors or resistors, wherein the sensing inductor or resistor is connected in circuit with another inductor or resistor whose changing inductance or resistance is creating unwanted signals which ordinarily cannot be distinguished from the desired signals.

It is also apparent that the principles of the described circuits also apply to their dual circuits.

The circuits of this invention are useful—for example—where the signal to be measured is generated by varying the inductance of a variable inductor upon a rotatable mass, where the signal is to be carried across the support bearings by a rotatable transformer.

The circuits of this invention are also useful—for example—where the signal to be measured is generated by varying the resistance of a variable resistor upon a rotatable mass, where the signal is to be carried by slip rings across the bearings.

It is, therefore, an object of this invention to reduce noise in an electrical sensing circuit.

It is a more particular object of this invention to enhance the sensing of signals caused by changes if immittance of a sensor, connected in circuit with a second electrical element whose immittance is varying.

It is a still more specific object of this invention to sense signals caused by changes in capacitance of a sensing capacitor, connected in circuit with a second capacitor whose capacitance is also changing.

It is another specific object of this invention to sense the signals caused by changes in inductance of an inductor, connected in circuit with a second inductor whose inductance is also changing.

It is another specific object of this invention to sense the signals caused by changes in resistance or conductance of a sensing resistor, connected in circuit with a second resistor whose resistance is also changing.

Other objects will become apparent from the following description, taken in connection with the accompanying drawings in which:

FIG. 1 is a diagram of a device which may use the circuit of this invention;

FIG. 2 is a diagram of the device of FIG. 1, showing a pickoff capacitor upon a rotating member, and an air-bearing capacitor;

FIG. 3 is a diagram of a mercury contactor used to carry potential to one side of the pickoff capacitor of FIG. 2;

FIG. 4 is a first embodiment of the circuits of this invention;

FIG. 5 is a second embodiment of the circuits of this invention;

FIG. 6 is a third embodiment of the circuits of this invention; and

FIG. 7 is a fourth embodiment of the circuits of this invention.

DETAILED DESCRIPTION OF THE INVENTION

FIGS. 1, 2 and 3, show the rudimentary part of a device of the kind which is described and claimed in U.S. patent application, Ser. No. 612,401, filed Jan. 30, 1967, entitled "Two-Axes Angular Rate and Linear Acceleration Multisensor" by Harold F. Erdley. In that device, a motor 10 drives a shaft 12 which is supported for rotation upon gas bearings shown schematically in FIG. 2 at 14. Attached to the shaft 12 is a hub 16 which supports four radially directed torsion springs 18, 20, 22 and 24. The torsion springs 18, 20, 22 and 24 support, on their radially outward ends, torsionally vibratory members 26, 28, 30 and 32 which are adapted to oscillate about the torsion axes of their respective supporting torsion springs. The oscillation is sensed by means of capacitive plates, four of which are shown, by way of example, in FIG. 2 at 36, 38, 40 and 42. The plates 36, 38, 40 and 42 are rigidly attached to the shaft 12, but are electrically insulated therefrom by suitable insulating members (not shown).

The vibratory members 26, 28, 30 and 32, in a typical embodiment, have metallic surfaces forming condenser plates, which face the associated plates 36, 38, 40 and 42 and which are electrically connected to the shaft 12. The return electrical connection to those plates is through a mercury contactor shown more particularly in FIG. 3. In FIG. 3, a stationary pin 44 is inserted into a pool of mercury 46 in the end of shaft 12 to conduct signals from shaft 12 by conduction through mercury 46 and pin 44.

In FIG. 2 is shown an electrical connection of one of the plates 42 through a rotatable electrode 48. Signals are then transmitted across the air bearing 14 to a stationary electrode 50. In the subsequent description, the capacitance of the sensing capacitor will be that capacitance between—for example—member 32 and electrode 42, plus the leakage capacitance in parallel therewith, while the bearing capacitor will be the capacitance between electrodes 48 and 50. It is to be stressed, however, that additional bearing electrode pairs are connected to other sensing electrodes, as desired.

A first embodiment of the circuit of the invention is shown in FIG. 4. In FIG. 4, a source of signal current 52 is connected to apply a reference voltage to the inputs of the current generator 54, the 180° full wave demodulator 56, and the 0° full wave demodulator 58. The output terminals of demodulators 56 and 58 are connected through summing resistors 60 and 62, through a summing amplifier 64 and a filter network 66 to the output terminal.

The current generator 54 is adapted, at the frequency of the signal generator voltage, to generate an alternating current of substantially constant magnitude which is in phase with the voltage of the signal source 52. The current generator 54 applies a current to the network comprising the bearing capacitor 68, which is the capacitance across the air bearing, and the parallel combination of the sensing capacitor and the leakage capacitance, represented by 70, and a resistor 72. The return is then connected—for example—through a mercury cup 74 on the end of the shaft to the return terminal represented by the ground symbol. Alternatively the return could be a capacitive return across the gas bearing, through a rotary transformer, or a slip ring.

In the equations which follow, the carrier excitation amplitude of the signal source 52 is represented by the symbol "$e_s$," the angular frequency of the signal source 52 is represented by "$\omega$," the capacitance of the bearing capacitor 68 is represented by "$C_B$," the capacitance of the parallel combination of the pickoff capacitance and leakage capacitance 70 is represented by "$C_P$," and the resistance of resistor 72 is represented by "$R_P$." The resistances of resistors 76 and 78, which are circuit nulling components, are represented by the symbols "$R_1$" and "$R_2$." The voltage at the output of current generator 54, relative to the ground terminal, is represented by the symbol "$e_1$." The symbol "$s$" is the Laplace operator.

From inspection, the voltage $e_1$, the voltage at the output terminal of current generator 54, may be written in Laplace form $$e_1(s) = i(s)\left[\frac{1}{sC_B} + \frac{R_P}{1+sR_PC_P}\right]$$

wherein $i$, the output current from current generator 54, is in phase with and proportional to the voltage of source 72.

Taking the partial derivative of $e_1$ with respect to a change in the capacitance $C_B$ of the gas bearing, $$\frac{\partial e_1(s)}{\partial C_B} = \frac{-i(s)}{sC_B^2}$$

Taking the partial derivative of $e_1$ with respect to $C_P$, $$\frac{\partial e_1(s)}{\partial C_P} = \frac{-sR_P^2 i(s)}{[1+sR_PC_P]^2}$$

For steady state conditions, let $s=j\omega$, then, $$\frac{\partial e_1}{\partial C_B} = \frac{ji(j\omega)}{C_B^2}$$

$$\frac{\partial e_1}{\partial C_P} = \frac{-j\omega R_P^2 i(j\omega)}{1-\omega^2 R_P^2 C_P^2 + 2jR_PC_P}$$

Choose $R_P$ and $\omega$ so that $\omega R_P C_P = 1$. Then, $$\frac{\partial e_1}{\partial C_P} = \frac{-R_P i(j\omega)}{2C_P}$$

It should here be noted that the change in the voltage $e_1$ with a change in the pickoff capacitance $C_P$ is opposite in phase with the input current $i$. Also, the change in $e_1$ with a change in the bearing capacitance $C_B$ is always phase shifted 90° with respect to the input current $i$, independently of any of the circuit component values. Consequently, when the voltage $e_1$ is demodulated by using a reference voltage that is opposite in phase with the current $i$, the change in $e_1$ due to a change in $C_B$ is entirely rejected by the demodulator while full sensitivity changes in $e_1$ due to changes in $C_P$ is maintained.

The signal at the output terminal of amplifier 64 is a measure of changes in pickoff capacitance. The components 76 and 78 scale the amplitude of voltage applied to resistor 60 so that it is equal in amplitude to the steady state voltage applied to resistor 62 in the absence of any change in capacitance of capacitor 70. The two voltages applied to resistors 60 and 62 are opposite in phase, just canceling under steady conditions, so that the signal at the output of amplifier 64 is a measure of substantially only changes in capacitor 70. Any remaining ripple is filtered out by filter 66.

The preferred embodiment of FIG. 5 is more suitable than the circuit of FIG. 4 for use when the capacitance of the pickoff capacitor is small compared to the size of the input capacitance of normal demodulators or amplifiers. A reference source 52 is shown connected through a balanced transformer 96 to apply phase-opposing voltages to resistors 90 and 92. Resistors 90 and 92 have equal resistances. The junction of resistors 90 and 62 is connected to a capacitor 68 representing—for example—the capacitance across an air bearing of an air bearing supported shaft. Upon the supported member is a sensing capacitor 70 which is connected in parallel with a resistor 72. The parallel combination of capacitor 70 and resistor 72 is connected in series with the capacitance 68. Typically the capacitor 70 is a sensing capacitor of some kinds whose capacitance varies and in which the variation of capacitance is a measure of a parameter to be sensed. One terminal of the capacitor 70 is shown connected through—for example—a mercury contact such as that shown in FIG. 3, thence to the ground terminal. The circuit of capacitor 80 and resistor 82 is the same configuration as elements 70 and 72. The capacitor 84 corresponds to the capacitor 68 and is connected in circuit with elements 80 and 82 in the same fashion that the capacitance 68 is connected in circuit with elements 70 and 72. The terminal of elements 80 and 82 which is not connected to capacitor 84 is connected to the ground terminal. The terminal of capacitor 84 which is not connected to elements 80 and 82 is connected to the junction between resistors 92 and 60. Resistors 60 and 62 have equal resistances and are connected together to the input of summing amplifier 86. The phase shifter 94 shifts the phase of the signal voltage appearing at the terminal of resistor 90. The shifted voltage is connected as a reference voltage to the full wave demodulator 88. The full wave demodulator 88 is a phase-filter which transmits only signals which are of the proper phase with respect to the reference voltage applied to resistors 90 and 92. Filter 66 removes any unwanted ripple.

In the following description, $C_P$ is the capacitance of capacitor 70, which includes the sensing capacitance plus additional stray capacitance, $C_{p1}$ represents the capacitance of capacitor 80. $C_B$ is the capacitance of capacitor 68. $C_{B1}$ is the capacitance of capacitor 84. $R_P$ is the resistance of resistor 72. $R_{p1}$ is the resistance of resistor 82. $R_1$ is the resistance of resistors 90 and 92. $R_2$ is the resistance of resistors 60 and 62.

For the circuit of FIG. 5, $e_0$ is the voltage applied to the input of amplifier 86. The voltage at the junction between resistors 90 and 62 is designed at $e_1$, the voltage at the junction between resistors 60 and 92 is designated $e_2$, and the voltage at the input to amplifier 86 is $e_0$. All voltages are measured with respect to the ground terminal.

By inspection, $$e_0 = \frac{e_1 + e_2}{2}$$

Taking the partial derivative of $e_0$ with respect to changes in $C_B$, $$\frac{\partial e_0}{\partial C_B} = \frac{1}{2} \frac{\partial e_1}{\partial C_B}$$

Similarly $$\frac{\partial e_0}{\partial C_P} = \frac{1}{2} \frac{\partial e_1}{\partial C_P}$$

By inspection, if the signal at the junction between transformer 96 and resistor 90 is designated as $+e_s$ and the signal at the junction between the transformer 96 and resistor 92 is designated $-e_s$, $$e_1 = e_s \left[ \frac{\frac{1}{sC_B} + \frac{R_p}{1+sR_pC_p}}{R_1 + \frac{1}{sC_B} + \frac{R_p}{1+sR_pC_p}} \right]$$

It is assumed in the above equation that substantially zero current will be delivered through resistor 62 to the amplifier 86. Substituting the last equation into the equation for the partial derivative of $e_0$ with respect to $C_B$, $$\frac{\partial e_0}{\partial C_B} = \left[ \frac{-e_s}{2sC_B^2 \left[ R_1 + \frac{1}{sC_B} + \frac{R_p}{1+sR_pC_p} \right]} \right]$$

$$\left[ 1 - \frac{\frac{1}{sC_B} + \frac{R_p}{1+sR_pC_p}}{R_1 + \frac{1}{sC_B} + \frac{R_p}{1+sR_pC_p}} \right]$$

Similarly, finding the partial derivative of $e_0$ with respect to $C_P$, $$\frac{\partial e_0}{\partial C_p} = \left[ \frac{-sR_p^2 e_s}{2(1+sR_pC_p)^2 \left[ R_1 + \frac{1}{sC_B} + \frac{R_p}{1+sR_pC_p} \right]} \right]$$

$$\left[ 1 - \frac{\frac{1}{sC_B} + \frac{R_p}{1+sR_pC_p}}{R_1 + \frac{1}{sC_B} + \frac{R_p}{1+sR_pC_p}} \right]$$

It may be noted that $$\frac{\partial e_0}{\partial e_p} = \left( \frac{1}{1+sR_pC_p} \right)^2 s^2 R_p^2 C_B^2 \frac{\partial e_0}{\partial C_B}$$

For steady state conditions allow "$s$" to equal "$j\omega$," wherein $\omega$ is the angular frequency of the voltage of the reference voltage source 52.

$$\frac{\partial e_0}{\partial C_p} = -\left[ \frac{1}{1+j\omega R_p C_p} \right]^2 \omega^2 R_p^2 C_B^2 \frac{\partial e_0}{\partial C_B}$$

$R_P$ and the carrier frequency, $\omega$, are chosen so that $$R_P C_P = 1$$

Then $$\frac{\partial e_0}{\partial C_p} = \frac{-j\omega R_p C_B^2}{2C_p} \frac{\partial e_0}{\partial C_B} = \frac{-j}{2} \left( \frac{C_B}{C_p} \right)^2 \frac{\partial e_0}{\partial C_B}$$

Thus, with $\omega R_p C_p$ equal to 1, there is a 90° electrical phase shift between changes in output voltage caused by changes in the capacitance across the gas bearing 68 and changes in the output voltage caused by changes in the capacitance of the pickoff capacitor 70. The capacitance of capacitor 80 is set equal to the average capacitance of capacitor 70, the resistance of resistor 82 is set equal to the resistance of resistor 72, and the capacitance of capacitor 84 is set equal to the average capacitor of capacitor 68, whereby a voltage appears at the junction of resistors 60 and 92 which is equal to amplitude and opposite phase to the steady state of voltage appearing at the junction between resistors 62 and 90. Thus, only voltages which are measures of the changes in capacitance of capacitors 68 and 70 appear at the output of amplifier 86, with the voltages due to changes in capacitance of capacitor 70 in quadrature with the voltages due to changes in capacitance of capacitor 68. The full wave demodulator 88 receives from the phase shifter 94 a voltage which is in phase with the voltage produced by changes of capacitance of capacitor 70 so that substantially only voltages due to changes of capacitance of capacitor 70 are passed through the full wave demodulator 88. The filter 66 removes unwanted ripple from the resulting voltage. It should be noted that had it been desired to detect changes of capacitance of capacitor 68 instead of 70, phase shift producing signals in phase with signals produced by changes in 68 would cause the proper signals to appear at the output of demodulator 88.

In FIG. 6 is shown a circuit wherein—for example—a resistance strain gauge 112 is supported upon a rotatable shaft and is electrically connected with the stator by means of slip rings whose resistance is represented by resistor 110. By analogy to the embodiment of FIG. 4, the current generator 118 drives the circuit of resistors 110 and 112, connected in series, with capacitor 114 shunted across the resistor 112. The voltage across the series combination of resistors 110 and 112 is phase-filtered by the 90° full wave demodulator 116 whose output is then connected through a summing resistor 118 to the input of summing amplifier 122. The reference voltage source 100 is connected to apply a voltage to the 90° full wave demodulator 106 and to the 90° full wave demodulator 116. The input signal to the demodulator 106 is supplied from a voltage divider of resistors 102 and 104 through a phase, shifter 126. The output signal of demodulator 106 is in quadrature with the signal of voltage source 100 and is applied through resistor 120 to the input of amplifier 122. The outputs of demodulators 106 and 116 are 180° apart, so that only changes in signals due to changes in the resistance of resistor 112 generate an output signal at the output of amplifier 122.

In the following discussion, the output current of the current generator 108 is in phase with the voltage of voltage source 100 and is designated $i(s)$. The voltage at the output of current generator 108, with respect to the ground terminal, is designated $e_1$. The resistance of resistor 110 is designated $R_S$, the resistance of resistor 112 is designated $R_G$, and the capacitance of capacitor 114 is designated $C$. By inspection it may be seen:

$$e_1 = i(s) \left[ R_S = \frac{R}{1+sR_GC} \right]$$

Taking the partial derivative of $e_1$ with respect to changes in $R_S$:

$$\frac{\partial e_1}{\partial R_S} = i(s)$$

Taking the partial derivative of $e_1$ with respect to changes in $R_G$:

$$\frac{\partial e_1}{\partial R_G} = i(s) \left[ \frac{1}{1+sR_GC} \right]^2$$

For steady state conditions, set $s=j\omega$. Then, $$\frac{\partial e_1}{\partial R_G} = i(j\omega) \left[ \frac{1}{1-\omega^2 R_G^2 C^2 + 2j\omega R_G C} \right]$$

set $\omega^2 R_G^2 C^2 = 1$, whence $\omega R_G C = 1$, and $$\frac{\partial e_1}{\partial R_G} = \frac{i(j\omega)}{2j}$$

$$\frac{\partial e_1}{\partial R_\mathrm{s}} = i(j\omega)$$

It may be seen that $$\frac{\partial e_1}{\partial R_\mathrm{G}} = \left[\frac{1}{2j}\right]\frac{\partial e_1}{\partial R_\mathrm{S}}$$

Thus, the changes in the voltage applied to the input of demodulator 116 due to changes in $R_G$ are in quadrature with the voltage applied to the input of demodulator 116 due to changes in $R_S$. The demodulator 116 passes signals due to changes in $R_G$ and rejects signals due to changes in $R_S$. The signals applied to resistor 118 are opposite in phase to the signals applied to resistor 120. The resistances of resistors 102 and 104 are adjusted so that, in the absence of variations in resistance 112, no signal appears at the output of amplifier 122. Filter 124 removes ripple from the output signal.

It is obvious that, instead of a circuit as shown in FIG. 6, a circuit similar to that shown in FIG. 5 could be used for the separation of signals due to variations in the strain gauge resistance while rejecting signals caused by variations in the slip ring resistance.

It is also obvious that duals of the circuits could be used, wherein instead of a current generator such as generator 108, a voltage generator would be used, wherein instead of a capacitor, an inductance would be used; wherein instead of a resistance, a conductance would be used; wherein instead of a series connection, a parallel connection would be used; and wherein instead of a parallel connection, a series connection would be used.

A typical circuit which uses a dual of the circuit of FIG. 4 is shown in FIG. 7. The circuit might, for example, represent a variable inductor in series with a resistor upon a shaft, wherein signals are transmitted by a rotary transformer across a rotation bearing.

In FIG. 7 is shown the dual circuit of FIG. 4. A voltage source 200 is the reference voltage. The reference voltage is connected to be demodulated by demodulator 202, whose input is scaled by resistors 204, 207. The output of demodulator 202 is connected through a summing resistor 208 to the input of amplifier 210. The voltage of reference source 200 is connected, through a power amplifier 202′, to apply an in-phase voltage to the circuit of inductors 204, 206 and resistors 211, 213. The resistance of resistor 213 is very very small and may be neglected in the calculations. The purpose of resistor 210 is to provide a voltage which is proportional to the current flow, said voltage being applied to the 180° full wave demodulator 212. The output of demodulator 212 is connected through resistor 214 to the input of amplifier 210. Only changes in voltage due to changes in the inductance $L_2$ appear at the output of amplifier 210. The filter 216 is used to remove ripple from the output voltage.

If it be considered that the changes in inductance of inductor 206 are to be sensed while changes in the inductance of inductor 204 are not to be sensed, the calculations which follow show how the circuit of FIG. 7 achieves that object. The voltage at the output of amplifier 202′ is designated $e(s)$. The inductance of inductor 204 is designated $L_1$. The inductance of inductor 206 is designated $L_2$. The resistance of resistor 208 is designated $R_0$. The current flow through resistor 210 is designated $i_1$.

$$i_1 = e(s)\left\{\frac{1}{sL_1} + \frac{1}{R_0 + sL_2}\right\}$$

Taking the partial derivative of $i_1$ with respect to changes $L_1$ and $L_2$;

$$\frac{\partial i_1}{\partial L_1} = e(s)\left\{\frac{-1}{sL_1^2}\right\}$$

$$\frac{\partial i_1}{\partial L_2} = e(s)\left\{\frac{-s}{(R_0 + sL_2)^2}\right\}$$

For steady state conditions let $s = j\omega$. Then $$\frac{\partial i_1}{\partial L_1} = e(j\omega)\left\{\frac{j}{\omega L_1^2}\right\}$$

and $$\frac{\partial i_1}{\partial L_2} = e(j\omega)\left\{\frac{-j\omega}{R_0^2 - \omega^2 L_2 + 2j\omega R_0 L_2}\right\}$$

Set $\omega^2 L_2^2 = R_0^2$. Whence, $\omega L_2 = R_0$.

Then $$\frac{\partial i_1}{\partial L_2} = e(j\omega)\left\{\frac{-\omega}{2R_0^2}\right\}$$

Thus, changes in $i_1$ due to changes in $L_1$ are in quadrature with changes in $i_1$ due to changes in $L_2$. The 180° full wave demodulator 212 acts as a phase-filter to prevent signals which are generated by changes in $L_1$ from reaching amplifier 210. Thus, the output of amplifier 210 is a measure of the changes in $L_2$.

The circuit of this invention, then, involves a pair of reactive or a pair of resistive components, connected in circuit, wherein variations of one of said components generates an undesired signal and variations in the other of the desired components represent a signal which is to be measured; additional reactive or resistive elements, connected in circuit with the first mentioned elements, to cause signals generated by one of the first mentioned elements to be in electrical quadrature with signals generated by the other of the first mentioned elements; and at least one phase-filter—for example phase-sensitive demodulators—connected to reject the undesired signal while passing the desired signal. In certain embodiments of the invention, additional cancelling signals are provided to cancel out the output signals which represent the steady state values of the various reactive and resistive components while passing signals representing variations from the steady state condition. It is also desirable, although certainly not essential, to remove any remaining ripple in the output signal.

Because the techniques of the circuits of this invention may be applied either to series or parallel circuits in which the signal is either a voltage or a current, the term "immittance" is used to represent both electrical impedance and electrical admittance.

Although the invention has been described in detail above, it is not intended that the invention should be limited to the particular embodiments described, but only in accordance with the spirit and scope of the appended claims.

What is claimed is:

1. A circuit for sensing signals produced by one of two varying impedances connected in circuit comprising:
   means including at least three impedance elements for receiving an alternating signal, said impedance elements including a first and a second impedance element connected in parallel and a third impedance element connected in series with said first and second elements, two of said impedance elements being varying impedance elements of like impedance specie, said alternating signal having a predetermined frequency to cause responses by said alternating signal to changes in the impedance of one of said varying impedance elements to be in substantially phase-quadrature with responses by said alternating signal to changes in the impedance of the other of said varying impedance elements; and
   a phase-filter connected to said impedance elements to receive said alternating signal, said phase-filter producing an output signal proportional to variations in a predetermined one of said varying impedance elements.

2. The circuit as claimed in claim 1 wherein said first impedance element is a variable capacitance reactance, said second impedance element is resistive and said third impedance element is a variable capacitive reactance.

3. The circuit as claimed in claim 2 wherein said phase-filter comprises a pair of demodulators, a summing amplifier and a capacitor, said pair of demodulators connected to receive said alternating signal as a reference, the input of a first one of said pair of demodulators connected to said impedance elements to pass only signals in phase with said alternating signal, the input of a second one of said pair of demodulators connected to receive and to pass said alternating signal, said summing amplifier connected to the outputs of said pair of demodulators to pass only changes in said alternating signal due to variations in said third impedance element, said capacitor connected to the output of said summing amplifier to remove the carrier frequency from the output signal from said summing amplifier.

4. The circuit as claimed in claim 1 wherein said first impedance element is a variable resistance, said second impedance element is a capacitive reactance, and said third impedance is a variable resistance.

5. The circuit as claimed in claim 4 wherein said phase-filter comprises a pair of demodulators, a phase shifter, a summing amplifier and a capacitor, said pair of demodulators connected to receive said alternating signal as a reference, said phase shifter connected to receive said alternating signal to produce an output signal in quadrature with said alternating signal, the input of a first one of said demodulators connected to said impedance elements to pass only signals that are in phase-quadrature with of said alternating signal, the input of a second one of said pair of demodulators connected to said phase shifter to pass the output signal from said phase shifter, said summing amplifier connected to the outputs of said pair of demodulators to receive only changes in said alternating signal due to variations in said first impedance element, said capacitor connected to the output of said summing amplifier to remove the carrier frequency from the output signal from said summing amplifier.

6. The circuit as claimed in claim 1 wherein said first impedance element is a variable inductive reactance, said second impedance element is a variable inductive reactance, and said third impedance element is resistive.

7. The circuit as claimed in claim 6 wherein said phase-filter comprises a pair of demodulators, a summing amplifier and a capacitor, said pair of demodulators connected to receive said alternating signal as a reference, the input of a first one of said pair of demodulators connected to the junction of said first, second and third impedance elements to pass only signals in phase with said alternating signal, the input of a second one of said pair of demodulators connected to receive and to pass said alternating signal, said summing amplifier connected to the outputs of said pair of demodulators to receive only changes in said alternating signal due to variations in said second impedance element, said capacitor connected to the output of said summing amplifier to remove the carrier frequency from the output signal from said summing amplifier.

8. A circuit for sensing signals produced by one of two varying impedances connected in circuit comprising:
a first circuit including at least three impedance elements, said first circuit including a first and second impedance element connected in parallel and a third impedance element connected in series with said first and second elements, two of said impedance elements being varying impedance elements;
a second circuit substantially identical to said first circuit, said second circuit including fourth and fifth impedance elements connected in parallel and a sixth impedance element connected in series with said fourth and fifth impedance elements, said second circuit connected to said first circuit to form a bridge network;
an alternating signal source connected to said first and second circuits to energize said impedance elements, said signal source having a predetermined frequency to cause responses in the output signal of said alternating signal source to changes in the impedance of one of said varying impedance elements to be in substantially phase-quadrature with responses by the output signal from said alternating signal source to changes in the impedance of the other of said varying impedance elements; and
a phase-filter connected to said first and second circuits to receive the output signal from said alternating signal source, said phase-filter producing an output signal proportional to variations in a predetermined one of said varying impedance elements.

9. The circuit as claimed in claim 8 wherein said first impedance element is a variable capacitive reactance, said second impedance element is resistive, and said third impedance element is a variable capacitive reactance, said fourth impedance element is a capacitive reactance, said fifth impedance element is resistive, and said sixth impedance element is a capacitive reactance, the capacitance of said fourth element being substantially equal to the average value of the capacitance of said first element and the capacitance of said sixth element being substantially equal to the average value of the capacitance of said third element.

10. The combination as claimed in claim 9 wherein said phase-filter comprises an amplifier, a demodulator, a phase shifter and a capacitor, said amplifier connected to said first and second circuits to receive only changes in the output signal from said alternating signal source due to variations in said first and third impedance elements, said phase shifter connected to said alternating signal source to produce an output signal in quadrature with the output signal from said alternating signal source, said demodulator connected to said phase shifter to receive the output signal therefrom as a reference, the input of said demodulator connected to said amplifier to pass only changes in the output signal from said alternating signal source due to variations in the impedance of said first impedance element, said capacitor connected to the output of said amplifier to remove the carrier frequency from the output signal from said demodulator.

References Cited

UNITED STATES PATENTS

| 2,968,180 | 1/1961 | Schafer. | |
| 3,224,257 | 12/1965 | Takami et al. | 73—88.5 |
| 3,243,702 | 3/1966 | Schuck. | |
| 3,299,286 | 1/1967 | Rohlwes | 328—1 |
| 3,109,145 | 10/1963 | Morris et al. | 328—1 |
| 3,302,459 | 2/1967 | Isoda et al. | |

DONALD D. FORRER, Primary Examiner

H. A. DIXSON, Assistant Examiner

U.S. Cl. X.R.

328—133; 324—59, 61, 71, 118; 73—505